United States Patent [19]
Paschke et al.

[11] Patent Number: 5,912,307
[45] Date of Patent: Jun. 15, 1999

[54] POLYESTER COMPOSITIONS

[75] Inventors: Edward E. Paschke, Wheaton; Charles W. Bauer, Batavia, both of Ill.; Frank C. Robertson, Bernex, Switzerland; James M. Tibbitt, Wheaton, Ill.

[73] Assignee: BP Amoco Corporation, Chicago, Ill.

[21] Appl. No.: 08/850,168

[22] Filed: May 2, 1997

Related U.S. Application Data

[60] Provisional application No. 60/016,584, May 3, 1996, and provisional application No. 60/021,542, Jul. 11, 1996.

[51] Int. Cl.[6] .................................................... C08F 20/00
[52] U.S. Cl. ............................................... 525/444
[58] Field of Search ................................................. 525/444

[56] References Cited

U.S. PATENT DOCUMENTS

| | | | |
|---|---|---|---|
| 4,234,708 | 11/1980 | Edelman et al. | 525/444 |
| 4,340,721 | 7/1982 | Bonnebat et al. | 528/272 |
| 4,358,491 | 11/1982 | Ota et al. | 428/35 |
| 4,403,090 | 9/1983 | Smith | 528/272 |
| 4,474,918 | 10/1984 | Seymour et al. | 524/324 |
| 4,482,586 | 11/1984 | Smith et al. | 428/35 |
| 4,578,295 | 3/1986 | Jabarin | 428/35 |
| 4,604,257 | 8/1986 | Smith et al. | 264/513 |
| 4,668,764 | 5/1987 | Satou | 528/308.1 |
| 5,409,983 | 4/1995 | Jones et al. | 524/439 |
| 5,571,584 | 11/1996 | Yamamoto et al. | 428/35.7 |

FOREIGN PATENT DOCUMENTS

| | | |
|---|---|---|
| 0646453 | 4/1995 | European Pat. Off. . |
| 19505680 | 2/1995 | Germany . |
| 1006117 | 6/1987 | Japan . |
| 4345831 | 5/1991 | Japan . |
| 5084808 | 9/1991 | Japan . |
| 5320378 | 5/1992 | Japan . |
| 9003993 | 4/1990 | WIPO . |
| 9633062 | 10/1996 | WIPO . |

*Primary Examiner*—Terressa Mosley
*Attorney, Agent, or Firm*—Thomas E. Nemo; Phyllis Turner-Brim; Wallace L. Oliver

[57] ABSTRACT

Polyester compositions containing terephthalate, 2,6-naphthalate and/or isophthalate moieties, and showing improved properties are disclosed.

28 Claims, No Drawings

POLYESTER COMPOSITIONS

This application claims the benefit of U.S. Provisional patent application Ser. No. 60/016,584, filed on May 3, 1996, and to U.S. Provisional patent application Ser. No. 60/021,542 filed on Jul. 11, 1996.

BRIEF DESCRIPTION OF THE INVENTION

New polyester compositions containing terephthalate (T), isophthalate (I) and 2,6-naphthalate (N) moieties that are semi-crystalline and have a density of about 1.362 g/cm³ or greater are disclosed. The compositions are useful for making films, fibers and containers for packaging.

This invention is also novel semi-crystalline polyesters containing specific mole ratios of terephthalate, isophthalate and naphthalate moieties (i.e., T/I/N and T/I) useful for producing fabricated articles that exhibit unexpectedly high density levels which are typically associated with a high level of crystallinity. The high density level is achieved by strain induced crystallization, thermal crystallization, or preferably a combination of strain induced crystallization and thermal crystallization. The polyesters of this invention have enhanced performance properties, in particular they exhibit excellent gas barrier properties.

This invention is a polyester composition comprising the following repeating unit:

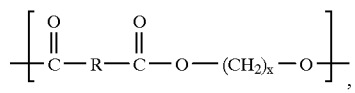

where in any unit x is an integer selected from 2 through 6, inclusive, and where in at least a portion of the units R is 1,3-phenyl, in at least a portion of the units R is 1,4-phenyl and in at least a portion of the units R is 2,6-naphthyl, and where the density of the polyester is at least about 1.362 g/cm³. Preferably in about 80 to about 96 mole percent of the units R is 1,4-phenyl, and in about 20 to about 4 mole percent of the units R is selected from 1,3-phenyl and 2,6-naphthyl where the mole ratio of 1,3-phenyl to 2,6-naphthyl is about 1:5 to about 5:1. This invention is also the polyester composition where in at least a portion of the units R is 1,4-phenyl and where in at least about 5 mole percent, preferably about 5 to about 25 mole percent, and most preferably about 10 to about 15 mole percent of the units in the polyester R is 1,3-phenyl, and preferably where in at least about 75 mole percent, more preferably about 75 to about 95 mole percent, and most preferably about 85 to about 95 mole percent of the units R is 1,4-phenyl, and where the density of the polyester is at least about 1.362 g/cm³. By 1,4-phenyl we mean a phenyl ring where the carboxylate groups of the polyester polymer unit are attached to the 1 and 4 positions of the phenyl ring, by 1,3-phenyl we mean a phenyl ring where the carboxylate groups of the polyester polymer unit are attached to the 1 and 3 positions of the phenyl ring, and by 2,6-naphthyl we mean a naphthalene ring where the carboxylate groups of the polyester polymer unit are attached to the 2 and 6 positions of the naphthalene ring. Preferably, x is 2. While the preferred polyesters of this invention are those where the only polymer ester units present are those where R is 1,4-phenyl, 1,3-phenyl and 2,6-naphthyl, or where R is 1,4-phenyl and 1,3-phenyl; the polyesters of this invention can also contain ester units where R is some other moiety, such as an aliphatic or other type of aromatic moiety.

This invention is a polyester composition comprising terephthalate and isophthalate moieties, or comprising terephthalate, isophthalate and 2,6-naphthalate moieties, which compositions have been subjected to strain induced crystallization, or a combination of strain induced and thermal crystallization. By terephthalate moiety we mean that ester unit or part of the polyester based on or derived from terephthalic acid or its equivalent; by isophthalate moiety we mean that ester unit or part of the polyester based on or derived from isophthalic acid or its equivalent; and by 2,6-naphthalate moiety we mean that unit or part of a polyester molecule based on or derived from 2,6-naphthalenedicarboxylic acid or its equivalent. The equivalent of terephthalic acid, isophthalic acid and 2,6-naphthalic acid can be, for example, the dimethyl ester or the diacid halide.

BACKGROUND

Poly(ethylene terephthalate) (PET) has been modified with low levels of isophthalic acid (i.e., up to about 3 mole percent) primarily to adjust (decrease) the rate of crystallization of PET, in order to obtain amorphous articles such as partially oriented yarns, amorphous sheets for thermoforming or biaxially oriented film fabrication, and bottle/jar preforms for injection stretch-blow molded containers. For most applications, however, it is most desired that the final fabricated article exhibit a high level of crystallinity, typically measured by density value. Crystallinity imparts high stiffness, low creep, improved barrier properties and other desired performance properties.

There is a need to modify PET to produce fabricated articles that have a combination of high density and enhanced performance properties, such as stiffness and barrier to gases. We have discovered that PET modified with a combination of isophthalate and 2,6-naphthalate moieties provides such improved polyesters. We have also discovered that PET modified with isophthalate moieties at levels at or greater than about 5 mole percent provides such improved properties.

DESCRIPTION OF THE PREFERRED EMBODIMENTS

Disclosed herein are new polyesters comprising terephthalate (T), isophthalate (I) and naphthalate (N) moieties, preferably where the terephthalate moieties comprise about 80 to 96 mole percent of the ester units in the polyester, and preferably where isophthalate and 2,6-naphthalate moieties comprise the remaining about 20 to about 4 mole percent of the ester units. The I/N mole ratio can be about 1:5 to about 5:1. More preferred, the I/N mole ratio is about 1:2 to about 2:1. More preferably, the terephthalate moieties comprise about 83 to about 90 mole percent of the ester units. Also disclosed herein are new polyesters comprising terephthalate and isophthalate moieties wherein the isophthalate moieties comprise at least about 5 mole percent of the ester units, preferably about 5 to about 25 mole percent, and most preferably about 8 to about 18 mole percent of the ester units, and preferably where the terephthalate moieties comprise at least about 75 mole percent, more preferably about 75 to about 95 mole percent, and most preferably about 82 to about 92 mole percent of the ester units. The density of the polyesters of this invention, as measured, for example, using a density gradient column (ASTMD 1505-85) is at least about 1.362 g/cm³, preferably at least about 1.365 g/cm³ and most preferably at least about 1.370 g/cm³. A polyester density of at least about 1.375 g/cm³ and at least about 1.380 g/cm³ can also be achieved. Preferably, the density of the polyesters of this invention is no more than about 1.455 g/cm³. This density can be achieved by strain induced crystallization or a combination of strain induced crystallization and thermal crystallization. The most preferred method to achieve the density level is by a combination of strain induced crystallization and thermal crystallization. Examples are: strain induced crystallization by fiber orientation followed by thermal crystallization by heat setting, strain induced crystallization by uniaxial or biaxial sheet orientation followed by thermal crystallization by heat setting, and strain induced crystallization by container injection blow molding or injection stretch-blow molding followed by thermal crystallization by heat setting.

Strain induced crystallization is a process whereby the polyester material in the form, for example, of a sheet or fiber is stretched at a suitable rate and temperature to achieve crystallization within the polyester. For strain induced crystallization useful for producing the polyester compositions of this invention, typical temperatures are about 80° C. to about 140° C., typical stretch rates are about 300 to about 1500%/second, and the stretch ratio suitable is about 8 to about 24. For fiber stretching or orientation, the stretch ratio of about 2 to about 8 is suitable.

Thermal crystallization is a process whereby the polyester is heated at a suitable temperature to induce additional crystallization and preferably where a stretched polyester material is retained in the stretched position and heated at a suitable temperature to induce additional crystallization. Suitable temperatures for such thermal crystallization to produce the compositions of this invention are about 100° C. to about 210° C., and the articles are typically retained at this temperature for about 1 second to about 5 minutes. Heat setting is a form of thermal crystallization whereby the polyester is maintained at the selected temperature for the selected times. Heat setting can be accomplished by subjecting the polyester article to heated air or to a heated metal surface such as a mold or godet.

Thermal crystallization of a fabricated article that has been previously strain crystallized can be accomplished on a laboratory scale by subjecting an oriented sample, for example, uniaxially oriented fiber or biaxially oriented film, to heating while the specimen is constrained. The sample is constrained to prevent relaxation and shrinkage during heating and this can be accomplished, for example, by fastening to a frame in the case of films or on rolls under tension for fibers.

The polyester starting materials used for making the high density polyesters of this invention can be prepared by standard melt esterification of the appropriate dicarboxylic acids in the proper mole ratio with a glycol such as ethylene glycol followed by polycondensation. Alternatively, the dimethyl esters of the carboxylic acids can be transesterified with a glycol such as ethylene glycol followed by polycondensation. Typical transesterification catalysts such as the acetates of zinc, manganese, cobalt, sodium and calcium can be employed individually or in combination with each other. The preferred transesterification catalyst is a combination of the acetates of cobalt and manganese. Typical polycondensation catalysts are the oxides of antimony and germanium.

The following describes a typical preparation of a 88/4.5/7.5 mole ratio T/I/N polyester using ethylene glycol as the glycol. The dicarboxylic acids in the appropriate mole ratio are added as solids into a reactor, and ethylene glycol is added so as to have a 1.15/1.00 mole ratio of ethylene glycol/dicarboxylic acids. Tetramethylammonium hydroxide is used at a level of 38 ppm as a diethylene glycol suppressant, and a mixture of 200 ppm antimony oxide and 20 ppm of cobalt acetate are used as polycondensation catalysts. All additive and catalyst levels are by weight based on the calculated polymer yield. The polymerization consists of a pressure esterification step, an atmospheric esterification step and a vacuum polycondensation step. The pressure esterification step is performed at 40 psig and a temperature of 220–240° C. for a time sufficient to remove, preferably, about 90 percent of the theoretical water by-product. Atmospheric esterification is performed at 240–260° C. for 60 minutes followed by polycondensation at 270–295° C. at less than 1 mm Hg vacuum level for sufficient time to reach a targeted inherent viscosity level, which is about 0.55–0.65 dL/g. The polymer can be extruded into strands, which can be cooled and chopped into pellets.

After pelletization, the molecular weight of the polymer can be increased by solid state polymerization as commonly practiced in the art. A rotary conical vacuum dryer provides a convenient means of solid state polymerizing the subject materials. In a typical procedure, the material is loaded into the dryer, rotation started, vacuum applied and the system purged with nitrogen. After purging, the system is heated to about 80° C. Once equilibrated at that temperature, the temperature is increased over a 6 hour period to about 160° C. and held at that temperature for about 6 hours. The system is then cooled to room temperature, the sample dumped and any agglomerations broken up. The crystallized sample is then reloaded into the dryer, purged with nitrogen, vacuum applied to a vacuum of about 1.0 mm Hg, and the system heated to 80° C., and then the temperature is increased over a 4 hour period to 216° C. The sample is held at that temperature until the desired inherent viscosity is achieved.

The preferred inherent viscosity of the solid stated materials, as measured in 60/40 (wt/wt) phenol/tetrachloroethane at 30° C., is 0.60–1.00 dL/gm. The most preferred inherent viscosity is 0.80–0.85 dL/gm.

Densities of samples of the polyester compositions can be increased by strain induced crystallization and further by thermal crystallization to prepare the polyester compositions of this invention. For example, 24 mil extruded sheet was made from 0.78 IV resin of the 88/4.5/7.5 T/I/N polyester composition (made using ethylene glycol as the glycol component) using a small (1½ in, 24/1 length/diameter (L/D)) Killion sheet extrusion line with a melt temperature of 300° C. Biaxially oriented film was then made from the extruded sheet using a T. M. Long film stretcher as follows. The extruded sheet was conditioned in a controlled temperature humidity room (23° C.–50% relative humidity (R.H.) for at least 24 hours prior to stretching. The preconditioned sheet sample was placed in the Long stretcher, heated for 120 seconds at 108° C. and stretched biaxially 3.5 times, i.e., stretched 3.5 times the original size in each direction. Samples of the biaxially oriented film were then placed in aluminum frames having 4 inch square openings. The frames containing the film samples were then placed in a hot air oven set at a preselected temperature. The samples were removed from the oven after 5 minutes, allowed to cool to room temperature and then removed from the frames. Densities of the heat set samples were determined using the gradient column method (ASTMD 1505-85). Results for samples from the 88/4.5/7.5 T/I/N polyester composition are shown below. Other T/I and other T/I/N compositions of this invention can be prepared with different mole ratios of I and N and other glycols using the same procedure.

| Sample | Density (g/cm³) | Crystallinity (%) |
|---|---|---|
| Extruded Sheet | 1.3364 | 2.9 |
| 3.5 × 3.5 Biaxially Oriented Film* | 1.3600 | 22.7 |
| Heat set Film (° C.): 120 | 1.3661 | 27.8 |
| 150 | 1.3744 | 34.8 |
| 180 | 1.3767 | 36.7 |
| 210 | 1.3815 | 40.8 |

*Stretched each direction 3.5 times the original size.

In addition to preparing these T/I or T/I/N compositions by reacting the appropriate molar ratios of terephthalic acid, isophthalic acid and 2,6-naphthalenedicarboxylic acid or their equivalents with the appropriate glycol and conducting the condensation reaction, one or more copolyesters such as an I/N copolyester or a T/N or T/I copolyester can be blended with, for example, PET in the proper amounts to form the desired T/I/N or T/I mole ratios. Thus, the polyester compositions of this invention can be prepared by blending the appropriate amounts of polyester, copolyester or terpolyester to form the desired composition, and then subjecting such compositions to strain induced crystallization and, preferably, a combination of strain induced crystallization and thermal crystallization. For example, three parts by weight of PET can be blended with one part by weight of 3/2 T/I copolyester to form a 9/1 T/I copolyester blend. Upon subjecting such blends to procedures for manufacturing film, fibers or containers, followed by strain induced crystallization and optionally followed by thermal crystallization, the high density polyester compositions of this invention can be prepared.

A wide variety of articles can be manufactured using the polyester resin compositions of this invention. Molded articles such as containers, and particularly containers such as bottles and jars, made from the polyester resin compositions of this invention can be manufactured by using melt molding methods. All known methods generally used for polyester molding, such as blow molding, are applicable. Typical examples of usual blow molding methods are extrusion blow molding, injection blow molding, and injection stretch blow molding. Injection stretch blow molding is the preferred fabrication method. In one type of injection stretch blow molding, a hollow preform is manufactured by injection molding and the preform is cooled to ambient temperature. A preform is a precursor for a container and is generally a cylinder closed at one end having a length about one third and an external diameter about one quarter of the final container made from the preform. Equipment for manufacturing preforms is available from Husky Injection Molding System and Krupp Corpoplast. The preform is then reheated to a temperature of about 80–140° C. and the heated preform is biaxially stretched in a mold in both the axial and hoop directions by blowing to form the final fabricated hollow article such as a jar or bottle. Suitable equipment for stretch blow molding is manufactured by Sidel Groupe. In another type of injection stretch blow molding, the hollow injection molded preform is made at an elevated temperature then directly cooled to a temperature of about 80–140° C. and the perform is then biaxially stretched into the final container design. Suitable equipment for this fabrication technique is manufactured by Aoki Technical Laboratory and Nissei ASB. Container stretch ratios, which are defined as the multiple of the individual axial and hoop stretch ratios, of about 8–24 can be employed for this invention, with stretch ratios of 12–18 being preferred. Container mold temperatures of 10–200° C. can be employed according to this invention with 60–160° C. being preferred. The stretch ratio, mold temperature and time at the mold temperature must be selected so as to achieve the desired density level. The strain induced crystallization is achieved during the stretch blow molding process and, if used, thermal crystallization, or heat setting, is achieved by the contact of the container with the metal mold at the preselected temperatures and for the preselected times to achieve the desired polyester density.

The T/I and T/I/N compositions of this invention may be used for preparing fibers, films and rigid containers. The films and containers show improved processability, strength and gas permeability characteristics. Improved gas permeability is particularly useful for films used in packaging and for bottles and other containers.

The polyester compositions of this invention demonstrate excellent gas barrier properties, particularly for carbon dioxide and oxygen. These excellent gas barrier properties make the polyesters of this invention highly suitable for manufacturing bottles and other containers used to package carbonated beverages. Small bottles, for example 20 oz. and less, made from the polyester of this invention have excellent shelf life properties.

Methods for making polyester fibers are disclosed in, for example, "Polyester-50 Years of Achievement," published by The Textile Institute, Manchester, England, printed in Dewsbury, England in 1993 by Stanley Press, and in "Wellington Sears Handbook of Industrial Textiles," by E. R. Kaswell, Wellington Sears Co., 1963, both of which publications are specifically incorporated herein by reference.

Table 1 shows the density and percent crystallinity of 3.5×3.5 biaxially oriented films of the 88/4.5/7.5 mole ratio T/I/N polyester composition (ethylene glycol as the glycol component) and the effect of heat setting to increase density.

Table 2 shows the $CO_2$ permeability of 3.5×3.5 biaxially oriented films of the 88/4.5/7.5 T/I/N composition (ethylene glycol as the glycol component), non-heat set and heat set, compared to biaxially oriented films from PET and polyethylene naphthalate (PEN) homopolymers. The percent decrease in $CO_2$ permeability relative to that for the non-heat set PET film is shown.

Tables 1 and 2 show that T/I/N polyester compositions of this invention have improved density, crystallinity and $CO_2$ barrier properties compared to PET.

Glycols useful in preparing the compositions of this invention include glycols having 2 to 6 carbon atoms, inclusive, such as glycols of the structure:

HO—$(CH_2)_x$—OH, where x=2–6, inclusive.

Preferably, the glycol used is ethylene glycol, i.e. where x=2.

The polyesters of this invention can also contain effective amounts of one or more additives, such as stabilizers or pigments.

TABLE I

88/4.5/7.5 T/I/N Polyester Biaxially Oriented Film Heat Set 5 Minutes

| 3.5 × 3.5 Film | Density (g/cm³) | Increase (%) | Crystallinity (%) |
|---|---|---|---|
| No Heat set (° C.): | 1.3600 | | 22.7 |
| 120 | 1.3661 | 0.45 | 27.8 |
| 150 | 1.3744 | 1.06 | 34.8 |
| 180 | 1.3767 | 1.23 | 36.7 |
| 210 | 1.3815 | 1.58 | 40.8 |

TABLE 2

$CO_2$ Permeability of Heat Set Films

| Composition | Heat Set (H.S.) | Density (g/cm³) | Cryst. (%) | $CO_2$ Permeability* | % $CO_2$ Permeability Decrease Relative to PET** |
|---|---|---|---|---|---|
| PET[a] | No HS | 1.3661 | 27.1 | 30.0 | — |
| PET[a] | 210/5[d] | 1.3884 | 45.4 | 28.4 | 5.3 |
| 88/4.5/7.5[b] | No HS | 1.3600 | 22.7 | 26.3 | 12.3 |
| 88/4.5/7.5[b] | 120/5[d] | 1.3661 | 27.8 | 23.4 | 22.0 |
| 88/4.5/7.5[b] | 210/5[d] | 1.3815 | 40.8 | 21.2 | 29.3 |
| PEN[c] | No HS | 1.3468 | 26.6 | 4.9 | 83.7 |

*cc-mil/100 in²-day-atm at 35° C.
**non-heat set PET
[a]polyethylene terephthalate
[b]mole ratio: terephthalate/isophthalate/naphthalate in T/I/N
[c]polyethylene naphthalate
[d]° C. for number of minutes The entire specifications and claims of Provisional U.S. patent application Ser. No. 60/016,584, filed on May 3, 1996, and Provisional U.S. patent application Ser. No. 60/021,542, filed on Jul. 11, 1996, are hereby specifically incorporated by reference.

EXAMPLES

Crystallinity values reported herein were calculated from the density values, which were measured using the ASTM D-1505-85 procedure. Carbon dioxide ($CO_2$) permeability values were measured using the method described by T. L. Caskey in "Modern Plastics," page 148 (1967).

Example 1

For the preparation by melt polymerization of a 88/4.5/7.5 T/I/N terpolymer, the following reactants were added to a 56 liter batch reactor made of 316 stainless steel equipped with a helical anchor agitator rotating 52 rpm: ethylene glycol (16,523 grams), terephthalic acid (33,841 grams), isophthalic acid (1,731 grams), 2,6-naphthalenedicarboxylic acid (3,754 grams), 10% by weight of a tetramethylammonium hydroxide solution in water (17.19 grams), antimony trioxide (10.86 grams), and cobalt acetate (3.83 grams). The reactor was purged with nitrogen and the reactor was pressurized with nitrogen to 40 psig. The oil heating fluid used to heat the reactor had been heated to 121° C. and when the contents of the reactor reached 107° C., the start of pressure esterification was recorded. The oil temperature was increased to 274° C. in order to maintain a melt temperature (i.e., the temperature of the contents of the reactor) of 260° C., and the pressure was maintained at 40 psig by the release and condensation of water vapor. After 230 minutes, 7,130 grams of condensate was collected and the pressure was reduced over a period of 5 minutes to atmospheric pressure.

The atmospheric esterification step was conducted for 60 minutes at a melt temperature of 263° C. and 370 grams of condensate was collected. Fifty minutes after the start of the atmospheric esterification step, a mixture of 3.38 grams of phosphoric acid dissolved in 100 grams of ethylene glycol was added to the polymer melt. At the termination of the atmospheric esterification step, the oil temperature was increased so as to maintain a melt temperature of 274–288° C. and the pressure was reduced at a rate of about 25 mm Hg/minute to about 1.0 mm Hg vacuum level. As the melt viscosity of the terpolyester increased, the speed of the agitator was reduced step-wise in 5 rpm increments to 20 rpm. Polycondensation was continued for 233 minutes when the targeted torque of 2500 pound/inch was achieved at 20 rpm agitator speed.

The vacuum was released with nitrogen and 50 psig pressure of nitrogen was added to the reactor. The polymer was extruded into strands by the use of a melt pump on the bottom of the reactor. The strands were cooled in a water bath and chopped into amorphous pellets. The pellets had a 0.60 dL/g inherent viscosity as measured in 60/40 wt/wt phenol/tetrachloroethane at 30° C. at a concentration of 0.4 g/dL. Isolated product yield was 37,000 grams.

Example 2

Sixty-five pounds of the amorphous pellets from Example 1 were placed in a 70 liter rotary conical vacuum reactor with oil heat transfer fluid heated to 176° F. Vacuum was applied (0.5 mm Hg) and the reactor was rotated at a speed of 2 rpm. The oil temperature was increased over a period of 4.0 hours at a rate of 0.4° F./minute to a final temperature of 320° F. The pellets were crystallized at this temperature for 6.0 hours. The temperature was cooled to ambient, nitrogen was used to release the vacuum and the crystallized pellets were sieved to remove any agglomerated pellets. The yield of sieved pellets was 64 pounds.

Example 3

Sixty-four pounds of the crystalline pellets from Example 2 were placed in a 70 liter rotary conical vacuum reactor with oil heat transfer fluid heated to 170° F. Vacuum was applied (0.5 mm Hg) and the reactor was rotated at a speed of 2 rpm. The oil temperature was increased over a period of 4.0 hours at a rate of 1.0° F./minute to a final temperature of 410° F. Solid state polymerization was continued for 18 hours, the temperature was cooled to ambient, nitrogen was used to release the vacuum and the solid state polymerized pellets were sieved to remove any agglomerated pellets. The yield of sieved pellets was 62 pounds, and the pellets had an inherent viscosity (IV) of 0.78 dL/g.

Example 4
Extruded Sheet Preparation

Extruded sheet from Example 3 was made from 0.78 IV resin of the 88/4.5/7.5 T/I/N polyester composition using a Killion Model KL-125 1¼ inch, 24/1 L/D single screw extruder equipped with a 6 inch flexible lip sheet extrusion die and a 3 roll sheet take-off unit. Temperature setting in zones 1 through 6 (feed to exit) were 268, 274, 277, 277, 277 and 260° C. Melt temperature was 300° C. Screw speed was 75 rpm and take-up speed was 5.5 feet/minute. The temperature of cooling water to the 3 rolls of the take-off unit was 38° C. Under these conditions, 24 mil thick extruded sheet having a density of 1.3364 g/cm³ was produced.

Example 5
Biaxially Oriented Film Preparation

Biaxially oriented film was made from the 24 mil 88/4.5/7.5 T/I/N polyester extruded sheet using a T. M. Long film stretcher. Sample 2¼ inch squares were die cut from extruded sheet prepared as described in Example 4 above and conditioned in a controlled temperature humidity room (23° C.–50% R.H.) for 24 hours prior to stretching. The conditioned sheet samples were placed in the Long stretcher heated for 120 seconds at 108° C. and stretched biaxially at a strain rate of 300% per second to final dimensions in each direction 3.5 times greater than the starting dimensions. The density of the resulting 3.5×3.5 biaxially oriented film was 1.3600 g/cm³.

Example 6
Heat Setting of Biaxially Oriented Film

Heat setting was done using an aluminum frame having two 4 inch square openings. A sample of biaxially oriented film was placed in each opening of the frame, and the frame containing the samples was placed in a hot air oven set at a preselected temperature. The samples were removed from the oven after 5 minutes, allowed to cool at room temperature and then removed from the frames. Densities of the heat set samples were determined using the gradient column method (ASTMD 1505-85). Densities of 3.5×3.5 biaxially oriented films from the 88/4.5/7.5 T/I/N polyester compositions prepared as described in the above examples are shown below.

| Sample | Density (g/cm$^3$) | Increase in Density (%) |
|---|---|---|
| Extruded Sheet | 1.3364 | — |
| 3.5 × 3.5 Biaxially Oriented Film | 1.3600 | 18 |
| Heat set Film (° C.): 120 | 1.3661 | 2.2 |
| 150 | 1.3744 | 2.8 |
| 180 | 1.3767 | 3.0 |
| 210 | 1.3815 | 3.4 |

Example 7

For the preparation by melt polymerization of PETI-10 copolymer (polyethylene terephthalate modified with 10 mole percent isophthalate moieties, i.e., a 9/1 T/I), the following reactants were added to a 56-liter 316 stainless steel batch reactor equipped with a helical anchor agitator rotating at 52 rpm: ethylene glycol (16,860 grams), terephthalic acid (35,290 grams), isophthalic acid (3,920 grams), 10% by weight of a tetramethyl-ammonium hydroxide solution in water (11.2 grams), antimony trioxide (10.86 grams), and cobalt acetate (3.83 grams), The reactor was purged with nitrogen and the reactor was pressurized with nitrogen to 40 psig. The oil heating fluid used to heat the reactor had been heated to 121° C. and when the contents of the reactor reached 107° C., the start of pressure esterification was recorded.

The oil temperature was increased to 274° C. in order to maintain a melt temperature of 260° C., and the pressure was maintained at 40 psig by the release and condensation of water vapor. After 230 minutes, 7,475 grams of condensate was collected and the pressure was reduced a period of 5 minutes to atmospheric pressure.

The atmospheric esterification step was conducted for 60 minutes at a melt temperature of 263° C. and 420 grams of condensate was collected. Fifty minutes after the start of the atmospheric esterification step, a mixture of 3.38 grams of phosphoric acid dissolved in 100 grams of ethylene glycol was added to the polymer melt. At the termination of the atmospheric esterification step, the oil temperature was increased so as to maintain a melt temperature of 274–285° C. and the pressure was reduced at a rate of about 25 mm Hg/minute to about 1.0 mm Hg vacuum level. As the melt viscosity of the copolymer increased, the speed of the agitator was reduced step-wise in 5 rpm increments to 20 rpm. Polycondensation was continued for 225 minutes when the targeted torque of 2500 pound/inch was achieved at 20 rpm agitator speed.

The vacuum was released with nitrogen and 50 psig pressure of nitrogen was added to the reactor. The polymer was extruded into strands by the use of a melt pump on the bottom of the reactor. The strands were cooled in a water bath and chopped into amorphous pellets. The pellets had a 0.65 dL/g inherent viscosity as measured in 60/40 wtlwt phenol/tetrachlorethane at 30° C. at a concentration of 0.4 g/dL. Isolated product yield was 37,290 grams.

Example 8

Sixty-five pounds of PETI-10 from the above Example 7 were crystallized and solid state polymerized in a manner similar to that described in Examples 2 and 3. The times, temperatures, and vacuum levels were identical to the previous examples. The yield of sieved pellets was 61 pounds, and the pellets had an inherent viscosity of 0.81 dL/g.

The other compositions of this invention can be made using the procedures of Examples 1–7, inclusive.

Example 9

T/I and T/N copolyesters and T/I/N terpolyesters were melt polymerized in a manner similar to that described in Examples 1 and 7. The melt polymerized inherent viscosity values for the compositions and PET homopolymer are shown in Table 3.

TABLE 3

Summary of T/I/N Compositions

| Composition (T/I/N)* | I/N Ratio | Inherent Viscosity (dL/g) | | |
|---|---|---|---|---|
| | | Melt Polymerized | Solid State Polymerized | Extruded Sheet |
| PET | — | 0.62 | 0.76 | 0.73 |
| 8.0 Mole Percent Modified | | | | |
| PETN-8[a] | — | 0.61 | 0.80 | 0.75 |
| 92/4.0/4.0 | 1/1 | 0.61 | 0.78 | 0.73 |
| 92/5.3/2.7 | 2/1 | 0.61 | 0.81 | 0.79 |
| 10.0 Mole Percent Modification | | | | |
| PETI-10[b] | — | 0.65 | 0.81 | 0.78 |
| 12.0 Mole Percent Modification | | | | |
| PETN-12[a] | — | 0.64 | 0.80 | 0.78 |
| 88/4.0/8.0 | 1/2 | 0.60 | 0.81 | 0.80 |
| 88/8.0/4.0 | 2/1 | 0.61 | 0.81 | 0.78 |
| 16.0 Mole Percent Modification | | | | |
| PETN-16[a] | — | 0.58 | 0.78 | 0.73 |
| 84/5.3/10.7 | 1/2 | 0.60 | 0.81 | 0.76 |
| 84/8.0/8.0 | 1/1 | 0.62 | 0.80 | 0.76 |
| PETI-16[b] | — | 0.64 | 0.84 | 0.79 |

*Ethylene glycol is the glycol component.
[a]PETN-8, 12, 16 means a polyethylene terephthalate-naphthalate copolyester having 8, 10 and 16 mole percent naphthalate moieties, i.e., a T/N.
[b]PETI-10 and PETI-16 means a polyethylene terephthalate-isophthalate copolyester having 10 mole percent isophthalate and 16 mole percent isophthalate, respectively, i.e., a T/I.

Example 10

T/I and T/N copolyesters and T/I/N terpolyesters from Example 9 were crystallized and solid state polymerized in a manner similar to that described in Examples 2 and 3. The solid state polymerization inherent viscosity values for the compositions and for PET homopolymer are shown in Table 3.

Example 11

T/I and T/N copolyesters and T/I/N terpolyesters from Example 10 were extruded into sheet in a manner similar to that described in Example 4. The sheet inherent viscosity values for the compositions and for PET homopolymer are shown in Table 3.

Example 12

T/I and T/N copolyesters and T/I/N terpolyesters sheets from Example 11 were biaxially oriented into 3.0–3.0 biaxially oriented film in a manner similar to that described in Example 5. The films were then heat set in a manner similar to that described in Example 6. The initial sheet density and crystallinity, and the film density, density increase, crystallinity, carbon dioxide permeability, and carbon dioxide barrier improvement compared to PET are shown in Table 4 for both non-heat set film (no HS) and film heat set at 210° C. for 5 minutes (HS 210/5). The units for the carbon dioxide permeability (Perm.) values are cc-mil/100 in$^2$-day-atm. The percentages shown for $CO_2$ permeability are the percentages for the change in $CO_2$ permeability relative to PET.

TABLE 4

Film Properties

|  | Sheet | 3 × 3 no HS | 3 × 3 HS 210/5 |
|---|---|---|---|
| PET |  |  |  |
| Density g/cm$^3$ | 1.3376 | 1.3670 | 1.3885 |
| % Increase | — | 2.20 | 3.81 |
| % Cryst. | 3.8 | 27.9 | 45.5 |
| $CO_2$ Perm. | — | 35.8 | 30.5 |
| PETN-8$^a$ |  |  |  |
| Density g/cm$^3$ | 1.3364 | 1.3626 | 1.3830 |
| % Increase | — | 1.96 | 3.49 |
| % Cryst. | 3.7 | 25.7 | 42.9 |
| $CO_2$ Perm. | — | 30.2 | 25.8 |
|  |  | (−15.6%) | (−15.4%) |
| 92/4/4 T/I/N |  |  |  |
| Density g/cm$^3$ | 1.3379 | 1.3653 | 1.3835 |
| % Increase | — | 2.05 | 3.41 |
| % Cryst. | 3.6 | 26.3 | 41.4 |
| $CO_2$ Perm. | — | 29.9 | 24.6 |
|  |  | (−16.5%) | (−19.3%) |
| 92/5.3/2.7 T/I/N |  |  |  |
| Density g/cm$^3$ | 1.3376 | 1.3631 | 1.3835 |
| % Increase | — | 1.91 | 3.43 |
| % Cryst. | 3.0 | 24.3 | 41.3 |
| $CO_2$ Perm. | — | 28.7 | 24.8 |
|  |  | (−19.8%) | (−18.7%) |
| PETN-12$^a$ |  |  |  |
| Density g/cm$^3$ | 1.3362 | 1.3622 | 1.3764 |
| % Increase | — | 1.95 | 3.01 |
| % Cryst. | 3.6 | 25.8 | 37.9 |
| $CO_2$ Perm. | — | 28.5 | 25.0 |
|  |  | (−20.4%) | (−18.0%) |
| 88/4.5/7.5 T/I/N |  |  |  |
| Density g/cm$^3$ | 1.3368 | 1.3615 | 1.3785 |
| % Increase | — | 1.85 | 3.12 |
| % Cryst. | 3.2 | 23.9 | 38.2 |
| $CO_2$ Perm. | — | 32.0 | 25.0 |
|  |  | (−10.6%) | (−18.0%) |
| 88/8/4 T/I/N |  |  |  |
| Density g/cm$^3$ | 1.3366 | 1.3634 | 1.3805 |
| % Increase | — | 2.01 | 3.28 |
| % Cryst. | 1.8 | 24.1 | 38.3 |
| $CO_2$ Perm. | — | 26.8 | 19.6 |
|  |  | (−25.1%) | (−35.7%) |
| PETI-10$^b$ |  |  |  |

TABLE 4-continued

Film Properties

|  | Sheet | 3 × 3 no HS | 3 × 3 HS 210/5 |
|---|---|---|---|
| Density g/cm$^3$ | 1.3383 | 1.3620 | 1.3839 |
| % Increase | — | 1.77 | 3.41 |
| % Cryst. | 3.9 | 23.4 | 41.3 |
| $CO_2$ Perm. | — | 27.7 | 19.8 |
|  |  | (−22.6%) | (−35.1%) |
| PETN-16$^a$ |  |  |  |
| Density g/cm$^3$ | 1.3350 | 1.3601 | 1.3761 |
| % Increase | — | 1.88 | 3.08 |
| % Cryst. | 2.6 | 24.3 | 38.1 |
| $CO_2$ Perm. | — | 26.6 | 23.0 |
|  |  | (−25.7%) | (−24.6%) |
| 84/5.3/10.7 T/I/N |  |  |  |
| Density g/cm$^3$ | 1.3360 | 1.3617 | 1.3772 |
| % Increase | — | 1.92 | 3.08 |
| % Cryst. | 2.5 | 24.3 | 37.5 |
| $CO_2$ Perm. | — | 25.1 | 22.0 |
|  |  | (−29.9%) | (−27.9%) |
| 84/8/8 T/I/N |  |  |  |
| Density g/cm$^3$ | 1.3361 | 1.3608 | 1.3771 |
| % Increase | — | 1.85 | 3.07 |
| % Cryst. | 1.8 | 22.5 | 36.2 |
| $CO_2$ Perm. | — | 25.2 | 20.8 |
|  |  | (−29.6%) | (−31.8%) |
| PETI-16$^b$ |  |  |  |
| Density g/cm$^3$ | 1.3374 | 1.3601 | 1.3789 |
| % Increase | — | — | — |
| % Cryst. | 0.6 | 19.2 | 34.6 |
| $CO_2$ Perm. | — | 24.2 | 21.0 |
|  |  | (−32.4%) | (−31.1%) |

$^a$PETN-8, 12, 16 means a polyethylene terephthalate-naphthalate copolyester having 8, 10 and 16 mole percent naphthalate moieties, i.e., a T/N.
$^b$PETI-10 and PETI-16 means a polyethylene terephthalate-isophthalate copolyester having 10 mole percent and 16 mole percent isophthalate, respectively i.e., a 9/1 T/I and a 84/16 T/I.

Example 13

T/I and T/N copolyesters and T/I/N terpolyesters from Example 11 were biaxially oriented into 4×4 biaxially oriented film in a manner similar to that described in Example 5. The sheet and film densities, percent density increase and film crystallinity values are shown in Table 5.

TABLE 5

4 × 4 Film Properties

|  |  | Density g/cm$^3$ |  |  |  |
|---|---|---|---|---|---|
| Composition T/I/N$^a$ | I/N Ratio | Sheet | Film | Increase (%) | Film Crystallinity (%) |
| PET | — | 1.3376 | 1.3702 | 2.44 | 30.5 |
| 8.0 Mole Percent Modification |  |  |  |  |  |
| PETN-8a | — | 1.3364 | 1.3671 | 2.30 | 29.5 |
| 92/4.0/4.0 | 1/1 | 1.3379 | 1.3674 | 2.20 | 28.1 |
| 92/5.3/2.7 | 2/1 | 1.3376 | 1.3689 | 2.34 | 29.1 |
| 10.0 Mole Percent |  |  |  |  |  |

TABLE 5-continued

4 × 4 Film Properties

| Composition T/I/N[a] | I/N Ratio | Density g/cm³ Sheet | Film | Increase (%) | Film Crystallinity (%) |
|---|---|---|---|---|---|
| Modification | | | | | |
| PETI-10[b] | — | 1.3383 | 1.3673 | 2.17 | 27.7 |
| 12.0 Mole Percent Modification | | | | | |
| PETN-12[a] | — | 1.3362 | 1.3666 | 2.28 | 29.6 |
| 88/4.0/8.0 | 1/2 | 1.3368 | 1.3659 | 2.18 | 27.6 |
| 88/8.0/4.0 | 2/1 | 1.3366 | 1.3657 | 2.18 | 26.0 |
| 16.0 Mole Percent Modification | | | | | |
| PETN-16[a] | — | 1.3350 | 1.3613 | 1.97 | 25.3 |
| 84/5.3/10.7 | 1/2 | 1.3360 | 1.3625 | 1.98 | 25.0 |
| 84/8.0/8.0 | 1/1 | 1.3361 | 1.3621 | 1.95 | 23.6 |
| PETI-16[b] | — | 1.3374 | 1.3635 | 1.95 | 22.0 |

[a]PETN-8, 12, 16 means a polyethylene terephthalate-naphthalate copolyester having 8, 10 and 16 mole percent naphthalate moieties, i.e., a T/N.
[b]PETI-10 and PETI-16 means a polyethylene terephthalate-isophthalate copolyester having 10 mole percent isophthalate and 16 mole percent isophthalate, respectively, i.e., a 9/1 T/I and a 84/16 T/I.

Example 14

Preforms (52.5 grams) designed for a straight wall 2 liter stretch blow molded bottle were injection molded from 0.80 IV PET control resin, 0.89 IV PETI-10 resin, and 0.81 IV 88/8/4 mole ratio T/I/N resin on an Arburg 320H single cavity injection molding machine. Temperature profiles and cycle times were as shown below.

| (Temperature, ° C.) | PET | PETI-10 | 88/8/4 |
|---|---|---|---|
| Nozzle | 275 | 260 | 260 |
| Front Zone | 285 | 270 | 265 |
| Middle Zone | 285 | 270 | 265 |
| Rear Zone | 275 | 255 | 255 |
| Cycle Time, sec. | 39.0 | 33.9 | 33.9 |

Two liter straight wall bottles were stretch blow molded on a Krupp Corpoplast LBO 1 stretch blow molding machine from these preforms. The preforms from all the compositions were heated to 105° C. prior to stretch blow molding.

Density and percent crystallinity of samples taken from the sidewall of the 2 liter bottles as molded and after heat setting at 160° C. for 2.5 seconds are shown below. Also shown are carbon dioxide permeability of non-heat set sidewall samples and estimated shelf life based on carbonation retention of whole bottles.

Bottle Sidewall Properties

| | PET | PETI-10 | 88/8/4 |
|---|---|---|---|
| Non-Heat Set | | | |
| Density g/cm³ | 1.3700 | 1.3640 | 1.3610 |
| Crystallinity (%) | 30.4 | 23.8 | 22.1 |
| After Heat Setting | | | |
| Density g/cm³ | 1.3768 | 1.3715 | 1.3705 |
| Crystallinity (%) | 35.9 | 29.9 | 30.0 |
| $CO_2$ Permeability on Whole Bottle | | | |
| Estimated Shelf Life in Weeks | 11.7 | 14.5 | |
| % Improvement in $CO_2$ Permeability Over PET | — | +24 | |

These data show the excellent $CO_2$ gas barrier properties achieved by the polyester compositions of this invention.

We claim:

1. A method for making high density polyester comprising subjecting a polyester composition comprising the following repeating units.

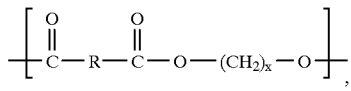

to strain induced crystallization and optionally followed by thermal crystallization to achieve a density of the polyester of at least about 1.362 g/cm³, where in any unit x is an integer selected from 2 through 6, inclusive, and where in at least a portion of the units R is 1,3-phenyl, in at least a portion of the units R is 1,4-phenyl and in at least a portion of the units R is 2,6-naphthyl.

2. The method of claim 1 wherein the strain induced crystallization is accomplished in a bottle blowing apparatus.

3. A method for making high density polyester comprising subjecting a polyester composition comprising the following repeating units

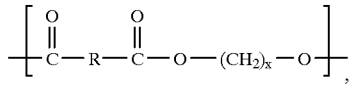

to strain induced crystallization and optionally followed by thermal crystallization to achieve a density of the polyester of at least about 1.362 g/cm³, where in any unit x is an integer selected from 2 through 6, inclusive, and where in at least a portion of the units R is 1,4-phenyl, and wherein at least about 5 mole percent of the total units R is 1,3-phenyl.

4. The method of claim 3 wherein the strain induced crystallization is accomplished in a bottle blowing apparatus.

5. A polyester composition comprising terephthalate moieties, at least about 4 mole percent isophthalate moieties and at least about 2 mole percent 2,6-naphthalate moieties which composition has been subjected to a combination of strain induced and thermal crystallization and having a density of at least about 1.362 g/cm³.

6. A bottle comprising the polyester composition of claim 5.

7. A film comprising the polyester composition of claim 5.

8. A polyester composition comprising terephthalate moieties and at least about 5 mole percent isophthalate moieties which composition has been subjected to a combination of strain induced and thermal crystallization and having a density of at least about 1.362 g/cm³.

9. A bottle comprising the polyester composition of claim 8.

10. A film comprising the polyester composition of claim 8.

11. A polyester composition comprising terephthalate moieties and at least about 8 mole percent isophthalate moieties which composition has been subjected to a combination of strain induced and thermal crystallization and having a density of at least about 1.362 g/cm³.

12. A bottle comprising the polyester composition of claim 11.

13. A film comprising the polyester composition of claim 11.

14. A method for making a high density polyester bottle comprising:

(a.) providing a polyester composition comprising terephthalate moieties, at least about 4 mole percent isophthalate moieties and at least about 2 mole percent 2,6-naphthalate moieties;

(b.) providing a forming means for subjecting the polyester composition to strain induced crystallization and forming the polyester composition into a bottle; and (c.) using the forming means to subject the polyester composition to strain induced crystallization and form the polyester composition into a bottle, wherein the bottle has a density of at least about 1.362 g/cm³.

15. The method according to claim 14 further comprising using the forming means to subject the polyester composition to thermal crystallization.

16. The method of claim 14 wherein the forming means is a bottle blowing apparatus.

17. A method for making a high density polyester bottle comprising:

(a.) providing a polyester composition comprising terephthalate moieties and at least about 5 mole percent isophthalate moieties; and (b.) providing a forming means for subjecting the polyester composition to strain induced crystallization and forming the polyester composition into a bottle; and (c.) using the forming means to subject the polyester composition to strain induced crystallization and form the polyester composition into a bottle, wherein the bottle has a density of at least about 1.362 g/cm³.

18. The method according to claim 17, further comprising using the forming means to subject the polyester composition to thermal crystallization.

19. The method of claim 17, wherein the forming means is a bottle blowing apparatus.

20. A polyester composition comprising terephthalate moieties, at least about 4 mole percent isophthalate moieties and at least about 2 mole percent 2,6-naphthalate moieties which composition has been subjected to strain induced crystallization and having a density of at least about 1.362 g/cm³.

21. A bottle comprising the polyester composition of claim 20.

22. A film comprising the polyester composition of claim 20.

23. A polyester composition comprising terephthalate moieties and at least about 5 mole percent isophthalate moieties which composition has been subjected to strain induced crystallization and having a density of at least about 1.362 g/cm³.

24. A bottle comprising the polyester composition of claim 23.

25. A film comprising the polyester composition of claim 23.

26. A polyester composition comprising terephthalate moieties and at least about 8 mole percent isophthalate moieties which composition has been subjected to strain induced crystallization and having a density of at least about 1.362 g/cm³.

27. A bottle comprising the polyester composition of claim 26.

28. A film comprising the polyester composition of claim 26.

* * * * *

UNITED STATES PATENT AND TRADEMARK OFFICE
CERTIFICATE OF CORRECTION

PATENT NO. : 5,912,307
DATED : Jun. 15, 1999
INVENTOR(S) : Edward E. Paschke, Charles W. Bauer, Frank C. Robertson, James M. Tibbitt It is certified that error appears in the above-identified patent and that said Letters Patent is hereby corrected as shown below:

Patent reads:

| Col. | Line | | |
|---|---|---|---|
| 9 | 20 | "18" | should read: "1.8" |
| 10 | 2 | "60/40 wtlwt" | should read: "60/40 wt/wt" |
| 11 | 8 | "into 3.0-3.0" | should read: "into 3.0x3.0" |

Signed and Sealed this

Twenty-first Day of December, 1999

Attest:

Q. TODD DICKINSON

Attesting Officer     Acting Commissioner of Patents and Trademarks